(12) United States Patent
Ma et al.

(10) Patent No.: US 11,095,496 B2
(45) Date of Patent: Aug. 17, 2021

(54) NETWORK FAILURE DETECTION METHOD AND NETWORK FAILURE DETECTION DEVICE

(71) Applicant: Wistron Corporation, New Taipei (TW)

(72) Inventors: Yan Ma, New Taipei (TW); Chun-Chih Lin, New Taipei (TW)

(73) Assignee: Wistron Corporation, New Taipei (TW)

( * ) Notice: Subject to any disclaimer, the term of this patent is extended or adjusted under 35 U.S.C. 154(b) by 2 days.

(21) Appl. No.: 16/718,116

(22) Filed: Dec. 17, 2019

(65) Prior Publication Data

US 2021/0083923 A1  Mar. 18, 2021

(30) Foreign Application Priority Data

Sep. 18, 2019 (CN) .......................... 201910881700.9

(51) Int. Cl.
*H04L 12/24* (2006.01)
*H04L 12/841* (2013.01)
*H04L 29/06* (2006.01)
*H04L 29/12* (2006.01)
*H04L 29/08* (2006.01)

(52) U.S. Cl.
CPC ............ *H04L 41/06* (2013.01); *H04L 47/286* (2013.01); *H04L 61/2015* (2013.01); *H04L 69/22* (2013.01); *H04L 67/06* (2013.01)

(58) Field of Classification Search
CPC ... H04L 41/06; H04L 61/2015; H04L 47/286; H04L 69/22; H04L 67/06
See application file for complete search history.

(56) References Cited

U.S. PATENT DOCUMENTS

| | | | |
|---|---|---|---|
| 2005/0180421 A1* | 8/2005 | Shimada | H04L 63/0236 370/389 |
| 2005/0271049 A1 | 12/2005 | Jain | |
| 2015/0021855 A1* | 1/2015 | Bierly | A63F 5/02 273/280 |
| 2016/0269245 A1* | 9/2016 | Barnes | H04L 43/10 |
| 2018/0324609 A1* | 11/2018 | Diancin | H04L 47/823 |
| 2019/0230118 A1* | 7/2019 | Chen | H04L 29/06 |
| 2020/0213214 A1* | 7/2020 | Huang | H04L 43/50 |

FOREIGN PATENT DOCUMENTS

| | | |
|---|---|---|
| CN | 104253755 A | 12/2014 |
| JP | 2012249138 | 12/2012 |
| TW | 200705883 | 2/2007 |

* cited by examiner

*Primary Examiner* — Habte Mered
(74) *Attorney, Agent, or Firm* — Winston Hsu (57) ABSTRACT

A network failure detection method and a network failure detection device are provided. The network failure detection method includes capturing a plurality of packets, analyzing contents of the plurality of packets and determining whether a network failure occurs to generate a determination result according to the contents of the plurality of packets, and outputting an alarm signal to implement an alarm function according to the determination result.

8 Claims, 6 Drawing Sheets

NETWORK FAILURE DETECTION METHOD AND NETWORK FAILURE DETECTION DEVICE

BACKGROUND OF THE INVENTION

1. Field of the Invention

The present invention relates to a network failure detection method and a network failure detection device, and more particularly, to a network failure detection method and a network failure detection device capable of automatically detecting network failure events and performing alarm function in real time.

2. Description of the Prior Art

With the rapid development of information technology and the Internet, the demand for Internet services has gradually increased. For example, emerging network technologies, such as data centers, cloud services, and virtual private networks (VPNs), are also being widely used in life. There may be multiple servers and various devices in a network environment architecture. Current network management control systems usually include functions such as environmental monitoring, remote control and error detection. An error detection module can instantly detect the hardware status of the servers and related accessories, and provide error alarm information or record error logs in real time. For example, the error detection module may detect whether the temperature of the central processing unit of the server is too high, detect whether the motherboard voltage or current is too high, detect whether the temperature of the case is too high, detect whether the fan speed is too high, whether the hard disk is damaged, or the network or detect whether a certain port of the switch is dropped. However, conventional network management control system does not provide corresponding detection and reporting functions for network environment failure or network architecture failure. The system maintenance person usually uses the packet capture software (e.g., Wireshark) to manually check packets in order to find out the cause of the abnormality and the point of failure. But the manually check operation is quite time consuming and labor intensive. Moreover, the network failures may directly lead to the collapse of the entire environmental service. For example, if a user accidentally inserts a network cable into a wrong port to make two network switches or two local area network (LAN) ports to form a loop or the user accidentally sets multiple dynamic host configuration protocol (DHCP) servers on the network during setting the network device, the network data will be blocked, the packet will be lost or the internet protocol (IP) address will not be obtained correctly, such that the preboot execution environment (PXE) may fail to start, the trivial file transfer protocol (TFTP)/file transfer protocol (FTP) file may fail to be transferred, the network service may be abnormal. Thus, there is a need for improvement over the prior art.

SUMMARY OF THE INVENTION

Therefore, the present invention primarily provides a network failure detection method and a network failure detection device capable of automatically detecting network failure events and performing alarm function in real time, in order to solve the above mentioned problems.

According to an aspect of an embodiment, a network failure detection method is disclosed. The network failure detection method comprises capturing a plurality of packets; analyzing contents of the plurality of packets and determining whether a network failure occurs to generate a determination result according to the contents of the plurality of packets; and outputting an alarm signal to implement an alarm function according to the determination result.

According to an aspect of another embodiment, a network failure detection device is disclosed. The network failure detection device comprises a packet capture module configured to capture a plurality of packets; a packet filter module configured to analyze contents of the plurality of packets and determine whether a network failure occurs to generate a determination result according to the contents of the plurality of packets; and an alarm module configured to output an alarm signal to implement an alarm function according to the determination result.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
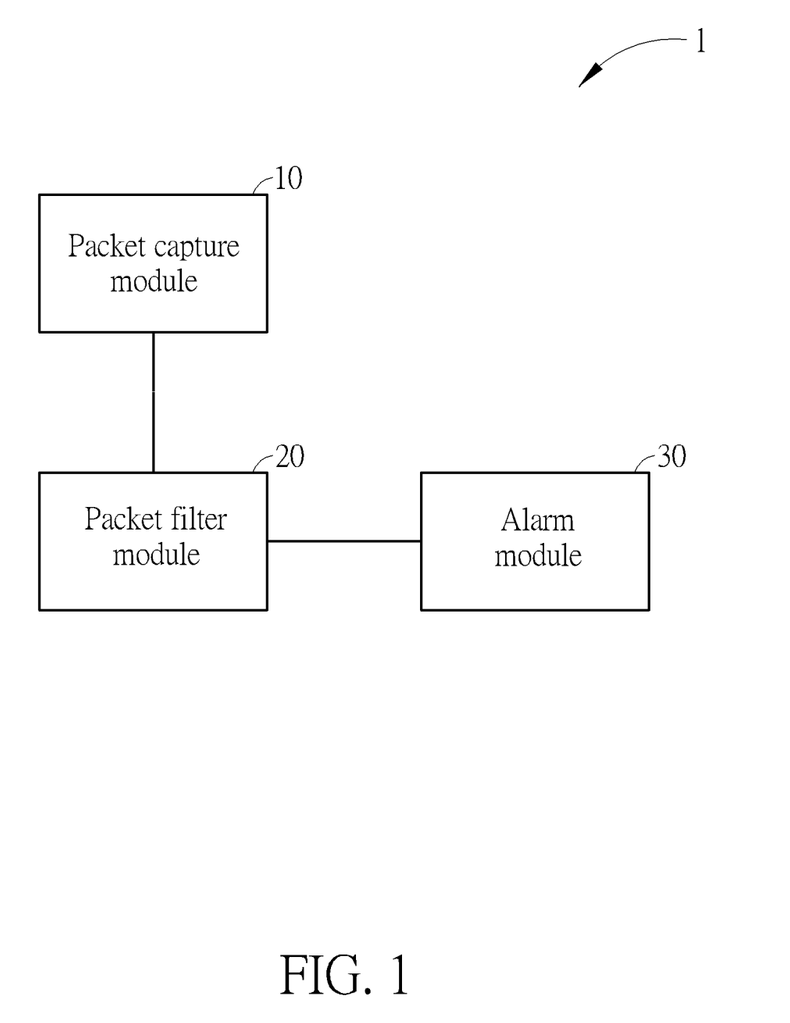
FIG. 1 is a schematic diagram illustrating a network failure detection device according to an embodiment of the present invention.

Please refer to FIG. 1, which is a schematic diagram of a network failure detection device 1 according to an embodiment of the present invention. The network failure detection device 1 can be applied in an electronic system with network applications. The network failure detection device 1 includes a packet capture module 10, a packet filter module 20 and an alarm module 30. The packet capture module 10 is configured to capture and receive packets. The packet filter module 20 is coupled to the packet capture module 10. The packet filter module 20 is configured to analyze contents of packets and determine whether a network failure occurs according to the contents of the plurality of packets so as to generate a corresponding determination result. The alarm module 30 is coupled to the packet filter module 20 and configured to output an alarm signal to implement an alarm function according to the determination result generated by the packet filter module 20.

Figure 2:
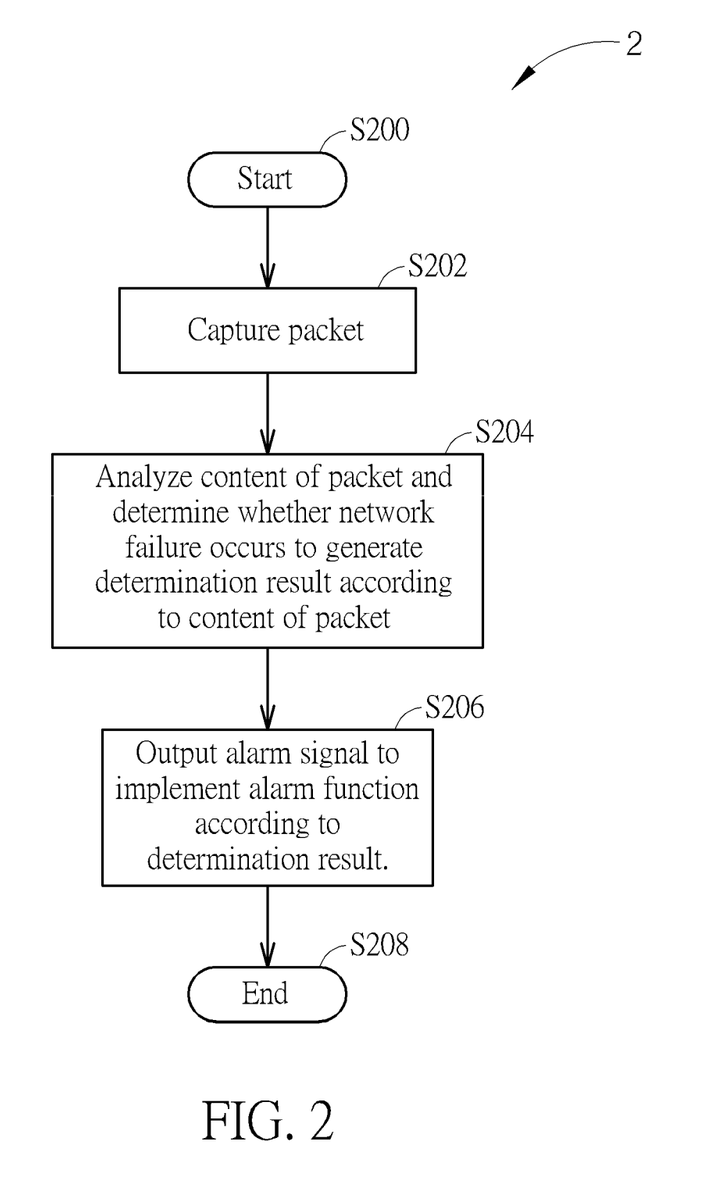
FIG. 2 is a flow diagram of a procedure according to an embodiment of the present invention.

For an illustration of the operations of the network failure detection device 1, please refer to FIG. 2. FIG. 2 is a flow diagram of a procedure 2 according to an embodiment of the present invention. The flowchart in FIG. 2 mainly corresponds to the operations on the network failure detection device 1 shown in FIG. 1. The procedure 2 includes the following steps:

Step S200: Start.
Step S202: Capture packets.
Step S204: Analyze contents of packets and determine whether a network failure occurs to generate a determination result according to the contents of the plurality of packets.
Step S206: Output an alarm signal to implement an alarm function according to the determination result.
Step S208: End.

According to the procedure 2, in Step S202, the packet capture module 10 captures and receives a plurality of packets through connecting to the network applied by the network failure detection device 1. The packet capture module 10 can capture and receive packets at intervals. The packet capture module 10 can capture and receive packets within a predetermined duration of each interval. In an embodiment, the packet capture module 10 can capture packets for a certain time period by using a packet capture library, such as libpcap function library, but not limited thereto.

In Step S204, the packet filter module 20 is configured to analyze contents of the packets captured by the packet capture module 10 and determine whether a network failure occurs according to the contents of packets so as to generate a corresponding determination result. In an embodiment, the packet filter module 20 analyzes the contents of the packets captured by the packet capture module 10 and detects time to live (TTL) values of the packets from the contents of the packets. Further, the packet filter module 20 determines whether the network failure occurs according to the TTL values of the plurality of packets. For example, the packet filter module 20 detects variations of the TTL value of each packet. When detecting that at least one TTL value of the packets is not decreased sequentially, the packet filter module 20 determines that a network failure has occurred and accordingly generates a corresponding determination result indicating that a network failure has occurred. For example, the packet capture module 10 captures and receives a plurality of packets between a time point t0 and a time point t4. Suppose the packet capture module 10 captures and receives a packet P1 at time points t1, t2 and t3, and the time points t1, t2 and t3 are between the time point t0 and the time point t4. The TTL value recorded in a TTL field of the packet P1 which is received at the time point t1 by the packet capture module 10 is 255 (i.e. the TTL value of the packet P1 received at the time point t1 is 255). The TTL value recorded in the TTL field of the packet P1 which is received at the time point t2 by the packet capture module 10 is 254 (i.e. the TTL value of the packet P1 received at the time point t2 is 254). The TTL value recorded in the TTL field of the packet P1 which is received at the time point t3 by the packet capture module 10 is 254 (i.e. the TTL value of the packet P1 received at the time point t3 is 253). The packet filter module 20 determines that the variation of the TTL value of the packet P1 is decreased sequentially since the variation of the TTL value of the packet P1 is as follows: 255, 254, 253. Under such a situation, when determining that the TTL value of the packet P1 is decreased sequentially and the TTL values of the other packets are decreased sequentially, the packet filter module 20 determines that the current network is normal without any network failure and accordingly generates a corresponding determination result indicating that no network failure occurs.

For example, suppose the packet capture module 10 captures and receives a packet P1 at time points t1, t2 and t3. The TTL values recorded in a TTL field of the packet P1 received at the time points t1, t2 and t3 are 255, 253, 254 (i.e. the TTL value of the packet P1 received at the time points t1, t2 and t3 are 255, 253, 254). The packet filter module 20 determines that the TTL value of the packet P1 is decreased and then is changed to increase since the variation of the TTL value of the packet P1 is as follows: 255, 253, 254. Since there has been an increment in the TTL value of the packet P1, the packet filter module 20 determines that the TTL value of the packet P1 is not decreased sequentially and determines that a network failure has occurred. Therefore, the packet filter module 20 generates a corresponding determination result indicating that a network failure has occurred. For example, suppose The TTL values recorded in a TTL field of the packet P1 received at the time points t1, t2 and t3 are 255, 255, 255 (i.e. the TTL value of the packet P1 received at the time points t1, t2 and t3 are 255, 255, 255). As such, the packet filter module 20 determines that the TTL value of the packet P1 remains unchanged. Since the TTL value of the packet P1 remains unchanged, the packet filter module 20 determines that the TTL value of the packet P1 is not decreased sequentially and determines that a network failure has occurred. According, the packet filter module 20 generates a corresponding determination result indicating that a network failure has occurred.

In an alternative embodiment, in Step S204, the packet filter module 20 is configured to analyze contents of the packets captured by the packet capture module 10 and determine whether a network failure occurs according to the contents of packets so as to generate a corresponding determination result. In an embodiment, the packet filter module 20 analyzes the contents of the packets captured by the packet capture module 10 and detects whether the packets include an address of a dynamic host configuration protocol (DHCP) server. The address of the DHCP server may be a physical address, a media access control (MAC) address or an internet protocol (IP) address, but not limited thereto. Further, the packet filter module 20 calculates the number of addresses of the DHCP server included in the plurality of packets. When calculating that the plurality of packets include only one address of the DHCP server, the packet filter module 20 determines that the current network is normal without any network failure and accordingly generates a corresponding determination result indicating that no network failure occurs. When calculating that the plurality of packets include more than one address (e.g., two addresses) of the DHCP server, this means that the DHCP service redundancy occurs. Accordingly, the packet filter module 20 determines that a network failure has occurred and generates a corresponding determination result indicating that a network failure has occurred.

In Step S206, the alarm module 30 outputs an alarm signal for implementing an alarm function according to the determination result generated by the packet filter module 20. When the determination result indicates that a network failure has occurred, the alarm module 30 outputs the alarm signal to notify the user of the occurrence of the network failure for implementing the alarm function. For example, the alarm module 30 generates an alarm signal by using an email function. When the determination result indicates that a network failure has occurred, the alarm module 30 sends an email to a mail recipient to notify the occurrence of the network failure according to a preset email address (e.g., administrator's email address). After receiving the email notification, the mail recipient begins to implement the following precautions in response to the network failure event. For example, the alarm signal can be an email. For example, the alarm module 30 generates an alarm signal by using a short message service (SMS) function. When the determination result indicates that a network failure has occurred, the alarm module 30 sends a short message to a message recipient to notify the occurrence of the network failure according to a preset phone number (e.g., administrator's phone number). After receiving the message notification, the message recipient begins to implement the following precautions in response to the network failure event. For example, the alarm signal can be a short message. For example, the alarm module 30 generates an alarm signal by using instant messaging software. The instant messaging software may be Facebook Messenger, WeChat, LINE, Skype, WhatsApp, Telegram or QQ, but not limited thereto. When the determination result indicates that a network failure has occurred, the alarm module 30 sends an instant message to an instant message recipient to notify the occurrence of the network failure according to a preset user account (e.g., administrator's user account). After receiving the instant message notification, the instant message recipient begins to implement the following precautions in response to the network failure event. For example, the alarm signal can be an instant message. For example, the alarm module 30 generates an alarm signal by using web notification function. When the determination result indicates that a network failure has occurred, the alarm module 30 sends a web page display content to a website such that web page display content can be displayed on the web page of the website in order to notify the occurrence of the network failure according to a preset website address (e.g., website address that the administrator can browse). For example, the alarm signal can be a web page display content.

Figure 3:
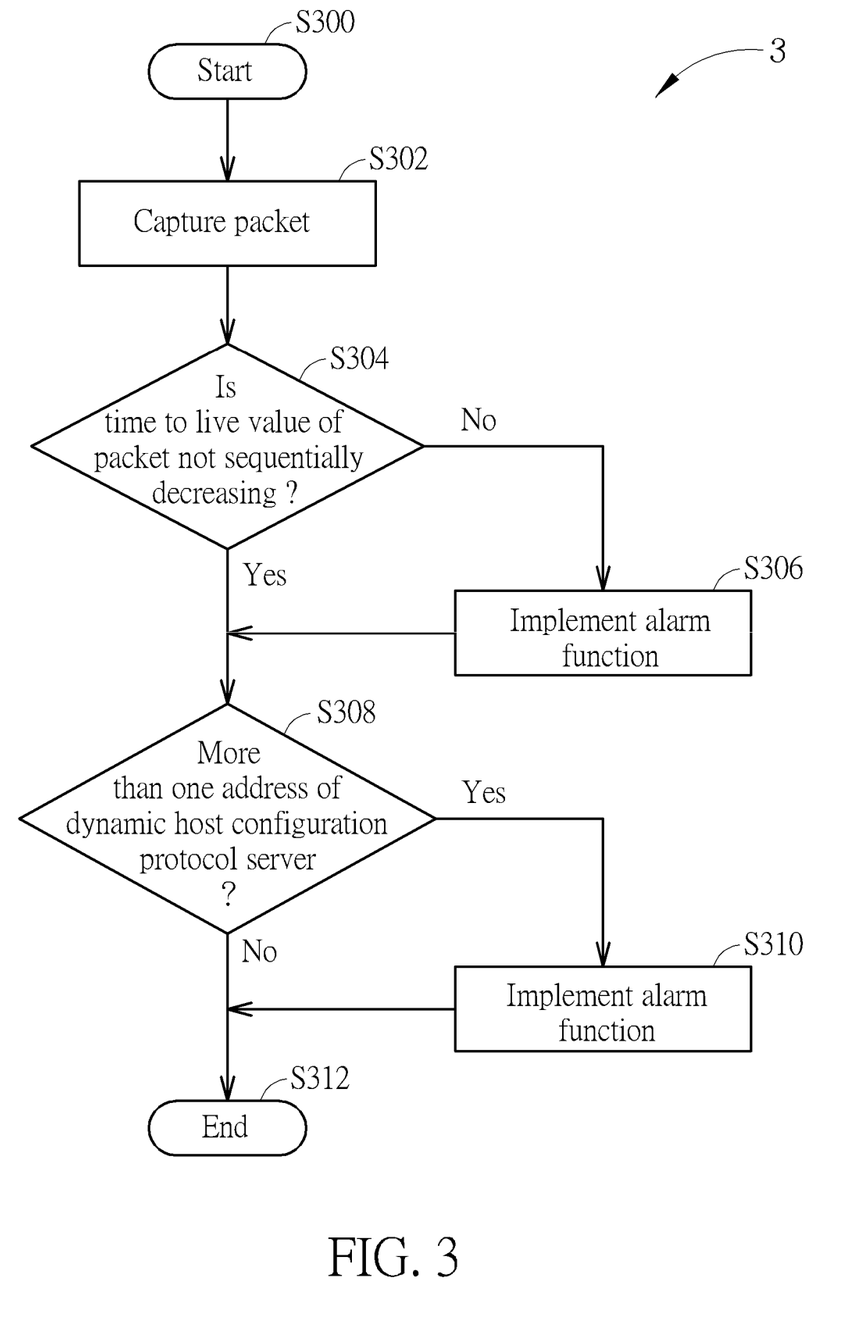
FIG. 3 is a flow diagram of a procedure according to an alternative embodiment of the present invention.

For an illustration of an alternative embodiment of the operations of the network failure detection device 1, please refer to FIG. 3. FIG. 3 is a flow diagram of a procedure 3 according to an alternative embodiment of the present invention. In Step S302, the packet capture module 10 captures and receives a plurality of packets through connecting to the applied network. In Step S304, the packet filter module 20 analyzes the contents of the packets captured by the packet capture module 10, detects TTL values of the packets and determines whether a network failure occurs according to the TTL values of the packets. The packet filter module 20 detects variations of the TTL value of each packet and detects whether a TTL value of the packets is not decreased sequentially. When detecting that at least one TTL value of the packets is not decreased sequentially, the packet filter module 20 determines that a network failure has occurred and accordingly generates a corresponding determination result indicating that a network failure has occurred, and then Step S306 is executed. In Step S306, the alarm module 30 outputs an alarm signal to notify the user about the occurrence of the network failure. After that, Step S308 is executed. In Step S308, the packet filter module 20 analyzes the contents of the packets captured by the packet capture module 10 and detects whether the packets include an address of the DHCP server. The packet filter module 20 calculates the number of addresses of the DHCP server included in the plurality of packets and determines whether the packets include more than one address of the DHCP server. When determining that the packets include more than one address of the DHCP server, the procedure 3 goes to Step S310. In Step S310, the alarm module 30 outputs an alarm signal again to notify the user about the occurrence of the network failure. In other words, the packet filter module 20 can detect whether a network failure occurs according to different detection and determination conditions and accordingly the alarm module 30 outputs an alarm signal to notify the user that the network failure has occurred.

Figure 4:
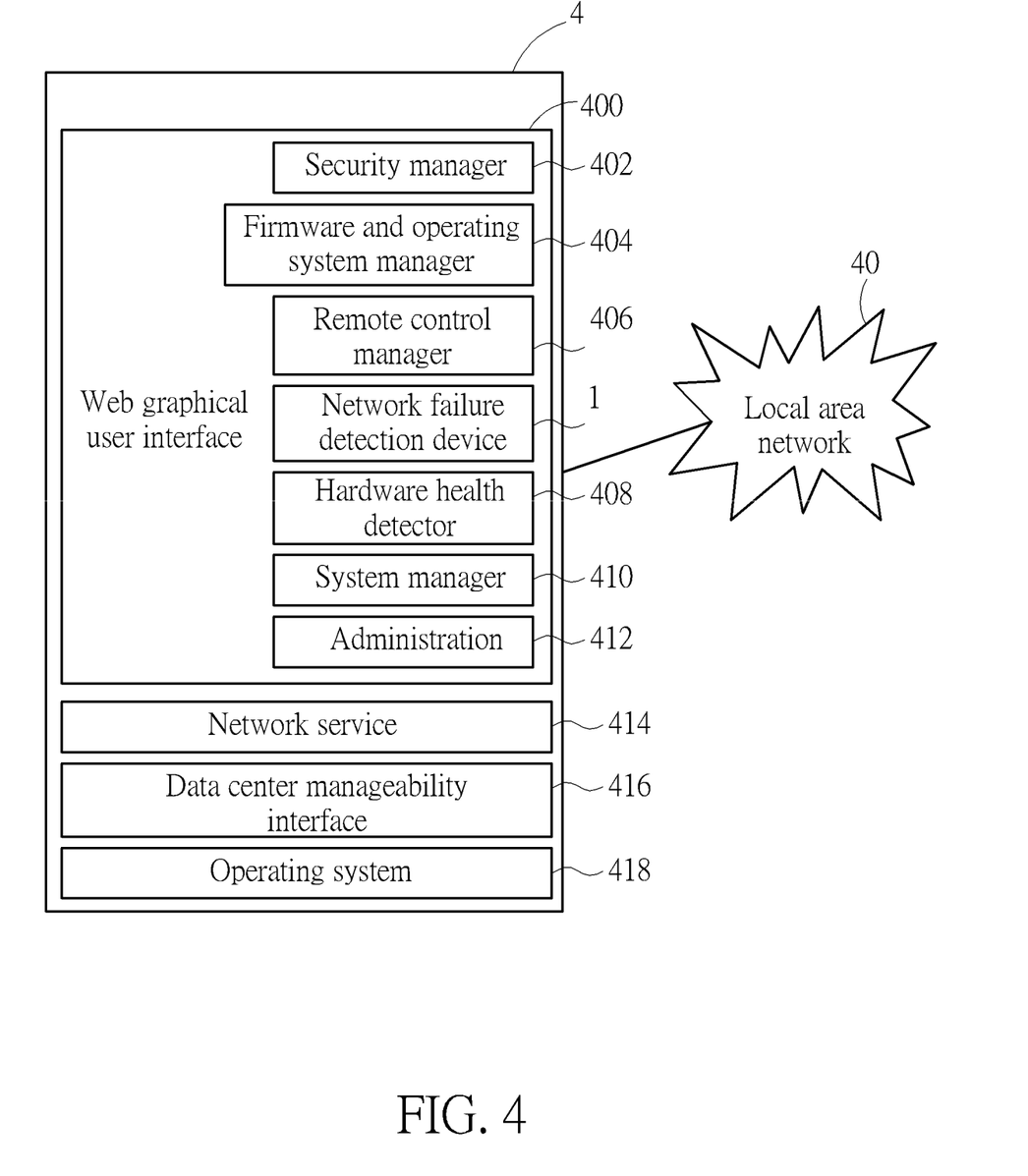
FIG. 4 is a schematic diagram illustrating the network failure detection device applied in a data center management system according to an embodiment of the present invention.

Please refer to FIG. 4. FIG. 4 is a schematic diagram illustrating the network failure detection device 1 applied in a data center management system 4 according to an embodiment of the present invention. The data center management system 4 is connected to a local area network (LAN) 40. The data center management system 4 includes a web graphical user interface (Web GUI) 400, a security manager 402, a firmware and operating system manager 404, a remote control manager 406, a hardware health detector 408, a system manager 410, an administration 412, a network service 414, a data center manageability interface (DCMI) 416 and an operating system 418. As shown in FIG. 4, the network failure detection device 1 can be applied in the data center management system 4. The security manager 402, the firmware and operating system manager 404, a remote control manager 406, a hardware health detector 408, the system manager 410 and the administration 412 can be set on the Web GUI 400. The administration 412 can set email addresses, mobile phone numbers, WeChat accounts, etc. The network failure detection device 1 is configured to implement the network failure detection function and implement the alarm function by utilizing the email addresses, mobile phone numbers, WeChat accounts preset by the administration 412 while determining that the network failure occurs for realizing the network failure detection and notification function.

Figure 5:
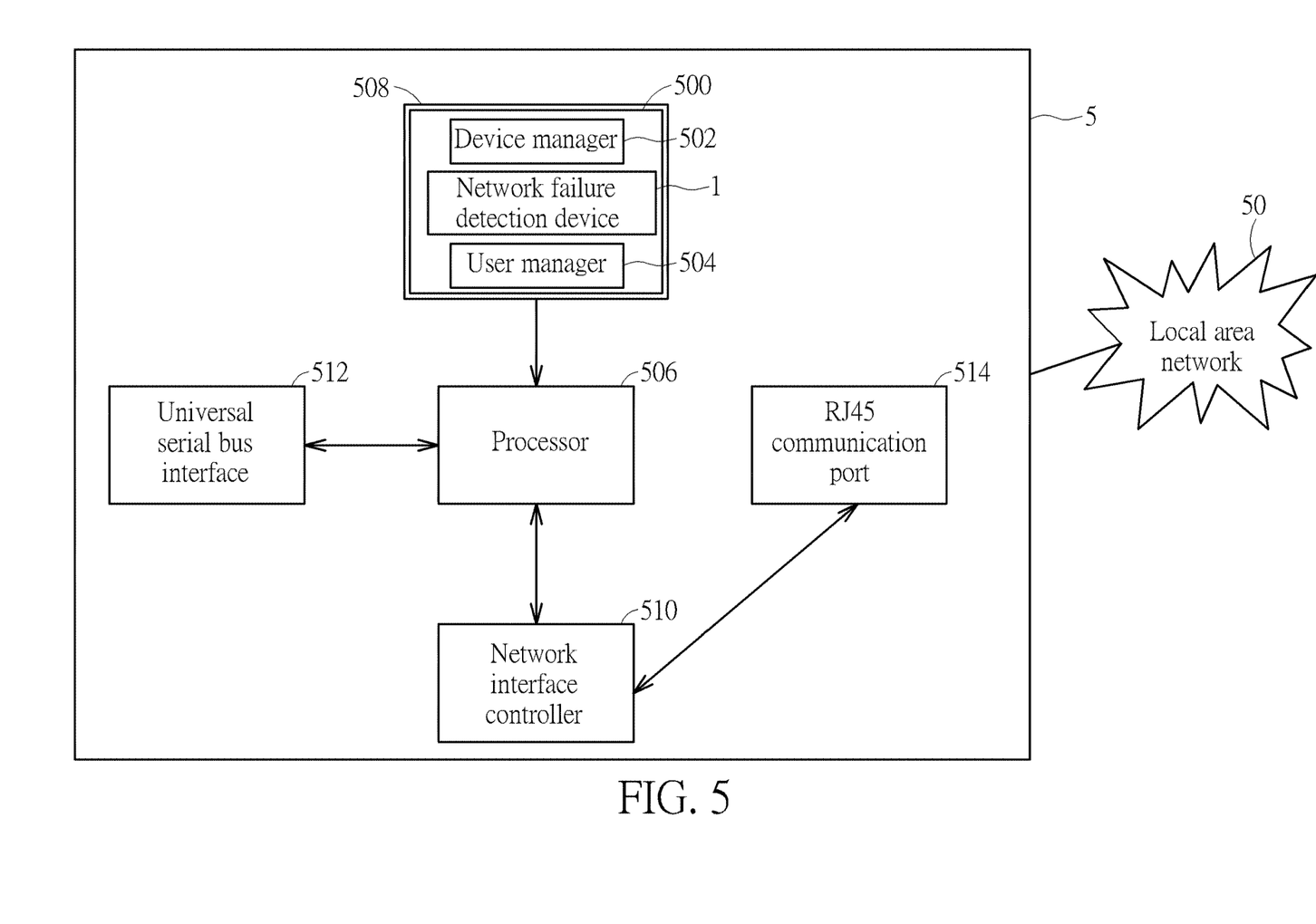
FIG. 5 is a schematic diagram illustrating the network failure detection device applied in an internet of things device according to an embodiment of the present invention.

Please refer to FIG. 5. FIG. 5 is a schematic diagram illustrating the network failure detection device 1 applied in an internet of things (IoT) device 5 according to an embodiment of the present invention. The IoT device 5 includes a web graphical user interface (Web GUI) 500, a device manager 502, a user manager 504, a processor 506, a storage device 508, a network interface controller (NIC) 510, a universal serial bus (USB) interface 512 and a RJ45 communication port 514. The processor 506 is coupled to the storage device 508, the NIC 510, the USB interface 512 and the RJ45 communication port 514. The device manager 502, a user manager 504 can be set on the Web GUI 500. The network failure detection device 1, the Web GUI 500, the device manager 502 and the user manager 504 can be stored in the storage device 508. The storage device 508 can be a flash memory. The processor 506 can access data stored in the storage device 508 for implementing related functions. The IoT device 5 can be powered via the USB interface 512. The IoT device 5 can be connected to a required network (e.g., LAN 50) via the RJ45 communication port 514. When the IoT device 5 has powered, the network failure detection device 1 applied in the IoT device 5, the device manager 502 and the user manager 504 begin to perform network failure detection service for detecting the network failure in real time. The system administrator can log in to the Web GUI 500 through the IP address. The device manager 502 can set physical address of the switch or the DHCP server for accurately detecting range of failure. The user manager 504 can set and manage user information, such as email addresses, mobile phone numbers, WeChat accounts, etc. The network failure detection device 1 is configured to implement the network failure detection function and implement the alarm function by utilizing the email addresses, mobile phone numbers, WeChat accounts preset by the user manager 504 while determining that the network failure occurs for realizing the network failure detection and notification function.

Figure 6:
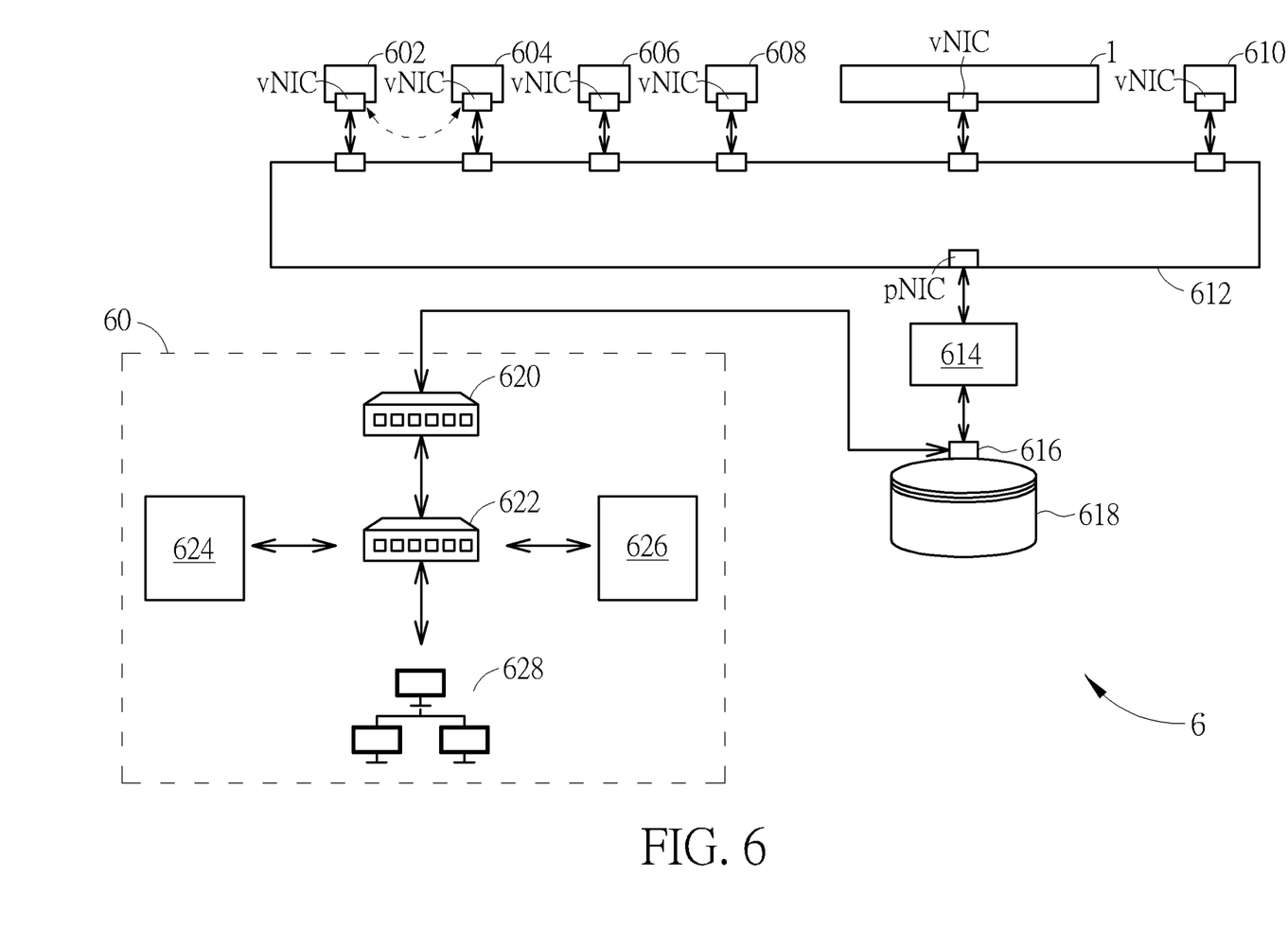
FIG. 6 is a schematic diagram illustrating the network failure detection device applied in a virtual network environment according to an embodiment of the present invention.

Please refer to FIG. 6. FIG. 6 is a schematic diagram illustrating the network failure detection device 1 applied in a virtual network 6 according to an embodiment of the present invention. The virtual network 6 is implemented based on software defined networking (SDN) architecture. In the virtual network 6, virtual machines (VMs) 602, 604 and 606, a kernel 608 and a service console 610 are respectively coupled to a hypervisor/virtual switch (vSwitch) 612 via a virtual network interface controller vNIC. The hypervisor/vSwitch 612 is coupled to a NIC 614 via a physical network interface controller (pNIC). The network interface controller 614 is coupled to a physical port 616. A physical/virtual switch 618 is coupled to the physical port 616. A network kernel switch 620 of an LAN 60 is coupled to the physical port 616. The network kernel switch 620, a DHCP and domain name system (DNS) server 624, a database and network server 626 and a terminal device 628 are coupled to a network switch 622. The network failure detection device 1 can be applied in the virtual network 6 for realizing the network failure detection and notification function.

Those skilled in the art should readily make combinations, modifications and/or alterations on the abovementioned description and examples. The abovementioned description, steps, procedures and/or processes including suggested steps can be realized by means that could be hardware, software, firmware (known as a combination of a hardware device and computer instructions and data that reside as read-only software on the hardware device), an electronic system, or combination thereof. Examples of hardware can include analog, digital and mixed circuits known as microcircuit, microchip, or silicon chip. Examples of the electronic system may include a system on chip (SoC), system in package (SiP), a computer on module (CoM). Circuits/modules in the embodiments of the invention may include function that may be implemented as software executed by a processor, hardware circuits or structures, or a combination of both. The processor may be a general-purpose or dedicated processor. The software may comprise programming logic, instructions, commands or data to implement certain function for an embodiment of the invention. The software may be stored in a medium accessible by a machine or computer-readable storage medium. The method, or certain aspects or portions thereof, may take the form of a program code. Any of the abovementioned procedures and examples above may be compiled into program codes or instructions that are stored in the storage circuit or computer-readable storage medium. A processor may read and execute the program codes or the instructions stored in the computer-readable storage medium for realizing the abovementioned functions. The computer-readable storage medium or a computer program product for storing program codes or instructions may include read-only memory (ROM), flash memory, random-access memory (RAM), hard disk, floppy diskette, or CD-ROM/DVD-ROM, flash drive, but not limited thereto.

In summary, embodiments of the invention can automatically detect network failure events and perform alarm function in real time so as to notify the user that a network failure event has occurred, thus realizing the network failure detection and notification function.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network failure detection method, comprising:
   capturing a plurality of packets;
   analyzing contents of the plurality of packets and detecting time to live values of the plurality of packets from the contents of the plurality of packets;
   determining whether a network failure occurs to generate a determination result according to the time to live values of the plurality of packets, the step comprising determining that the network failure occurs and generating the determination result when detecting that a time to live value of a first packet of the plurality of packets is not decreased sequentially; and
   outputting an alarm signal to implement an alarm function according to the determination result.

2. The network failure detection method of claim 1, wherein the step of analyzing contents of the plurality of packets and determining whether the network failure occurs to generate the determination result according to the contents of the plurality of packets comprises:
   analyzing the contents of the plurality of packets and detecting whether the plurality of packets include more than one address of a dynamic host configuration protocol server; and
   when detecting that the plurality of packets include more than one address of the dynamic host configuration protocol server, determining that the network failure occurs and accordingly generating the determination result.

3. The network failure detection method of claim 2, wherein the address of the dynamic host configuration protocol server is a physical address.

4. The network failure detection method of claim 1, wherein the step of outputting the alarm signal to implement the alarm function according to the determination result comprises outputting the alarm signal to implement the alarm function when the determination result indicates that the network failure occurs.

5. A network failure detection device, comprising:
   a packet capture module configured to capture a plurality of packets;
   a packet filter module, coupled to the packet capture module and configured to analyze contents of the plurality of packets and determine whether a network failure occurs to generate a determination result according to the contents of the plurality of packets; and
   an alarm module, coupled to the packet filter module and configured to output an alarm signal to implement an alarm function according to the determination result;
   wherein the packet filter module detects time to live values of the plurality of packets from the contents of the plurality of packets and determines whether the network failure occurs according to the time to live values of the plurality of packets, and when detecting that a time to live value of a first packet of the plurality of packets is not decreased sequentially, the packet filter module determines that the network failure occurs and accordingly generates the determination result.

6. The network failure detection device of claim 5, wherein the packet filter module analyzes the contents of the plurality of packets and detects whether the plurality of packets include more than one address of a dynamic host configuration protocol server, and when detecting that the plurality of packets include more than one address of the dynamic host configuration protocol server, the packet filter module determines that the network failure occurs and accordingly generates the determination result.

7. The network failure detection device of claim 6, wherein the address of the dynamic host configuration protocol server is a physical address.

8. The network failure detection device of claim 5, wherein when the determination result indicates that the network failure occurs, the alarm module outputs the alarm signal to implement the alarm function.

\* \* \* \* \*